US011312231B2

(12) United States Patent
Schlittenbauer et al.

(10) Patent No.: US 11,312,231 B2
(45) Date of Patent: Apr. 26, 2022

(54) POWER-SHIFT MULTI-SPEED TRANSMISSION

(71) Applicant: Robert Bosch GmbH, Stuttgart (DE)

(72) Inventors: Tobias Schlittenbauer, Asperg (DE); Ianislav Krastev, Ludwigsburg (DE); Wael Mohamed, Hemmingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/259,645

(22) PCT Filed: Jul. 10, 2019

(86) PCT No.: PCT/EP2019/068529
§ 371 (c)(1),
(2) Date: Jan. 12, 2021

(87) PCT Pub. No.: WO2020/011851
PCT Pub. Date: Jan. 16, 2020

(65) Prior Publication Data
US 2021/0323399 A1    Oct. 21, 2021

(30) Foreign Application Priority Data

Jul. 12, 2018   (DE) ................... 10 2018 211 672.5

(51) Int. Cl.
*B60K 17/08*       (2006.01)
*B60K 1/00*        (2006.01)
(Continued)

(52) U.S. Cl.
CPC ............... *B60K 17/08* (2013.01); *B60K 1/00* (2013.01); *B60T 1/005* (2013.01); *F16H 3/64* (2013.01);
(Continued)

(58) Field of Classification Search
CPC ... B60K 17/08; B60K 2001/001; B60T 1/005; F16H 3/64; F16H 61/0059;
(Continued)

(56) References Cited

U.S. PATENT DOCUMENTS 9,707,834 B2 *  7/2017  Lee ..................... F16H 3/663
10,208,837 B2 *  2/2019  Mordukhovich ....... F16H 3/663
(Continued)

FOREIGN PATENT DOCUMENTS

DE           19927521 A1    6/2000
DE       102013225519 A1 *  6/2015 ......... F16H 61/0059
(Continued)

OTHER PUBLICATIONS

Translation of International Search Report for Application No. PCT/EP2019/068529 dated Feb. 11, 2020 (2 pages).

*Primary Examiner* — Huan Le
(74) *Attorney, Agent, or Firm* — Michael Best & Friedrich LLP

(57) ABSTRACT

The invention relates to a power-shift multi-speed transmission (10) provided in the power train of a vehicle, comprising at least one sun gear (14, 80), at least one stepped planetary gear (16, 22), at least one ring gear (34, 36), and an input shaft (12) and an output shaft (40). The power-shift multi-speed transmission (10) can be shifted into a shift mode of a first speed or into a shift mode of a second speed and vice versa by means of the at least one stepped planetary gear (16, 22). A first brake (30) is associated with a first ring gear (34) and a second brake (32) is associated with a second ring gear (36). Depending on the actuation of these brakes, in the shift modes there is at least one torque flow under acceleration, or at least one torque flow on overrun, through the power-shift multi-speed transmission (10).

13 Claims, 4 Drawing Sheets

(51) Int. Cl.
*B60T 1/00* (2006.01)
*F16H 3/64* (2006.01)
*F16H 61/00* (2006.01)
*F16H 63/34* (2006.01)

(52) U.S. Cl.
CPC ..... *F16H 61/0059* (2013.01); *F16H 63/3416* (2013.01); *B60K 2001/001* (2013.01); *F16H 2200/0034* (2013.01); *F16H 2200/2005* (2013.01); *F16H 2200/2007* (2013.01); *F16H 2200/2035* (2013.01)

(58) Field of Classification Search
CPC ......... F16H 63/3416; F16H 2200/0034; F16H 2200/2005; F16H 2200/2007; F16H 2200/2035
See application file for complete search history.

(56) References Cited

U.S. PATENT DOCUMENTS

2011/0259657 A1   10/2011   Fuechtner
2018/0141557 A1    5/2018   Nefcy et al.

FOREIGN PATENT DOCUMENTS

| DE | 102013225519 A1 | 6/2015 |
| DE | 102015106503 A1 | 11/2015 |
| DE | 102014112602 A1 | 3/2016 |
| DE | 102015218252 A1 | 3/2017 |
| EP | 2388497 A1 | 11/2011 |
| EP | 2772665 A1 | 9/2014 |

* cited by examiner

POWER-SHIFT MULTI-SPEED TRANSMISSION

BACKGROUND OF THE INVENTION

The invention relates to a powershift-capable multi-ratio transmission which is arranged in the drivetrain of a vehicle, having at least one sun gear and at least one stepped planet gear, and furthermore having at least one ring gear, a drive shaft and also an output shaft.

DE 10 2014 112 602 A1 relates to an electric drive for a vehicle having a torque vectoring unit. The electric drive comprises a first electric machine, which has a rotor, and a transmission, wherein the transmission has a transmission input, which can be driven by means of the first electric machine, and two transmission outputs for driving two output shafts assigned to a vehicle axle. Furthermore, a torque vectoring unit is provided which has a second electric machine and a superposition transmission. The latter generates a torque difference between the two output shafts by means of the torque vectoring unit. An axis of rotation of the rotor of the first electric machine runs axially parallel with respect to a central axis of the superposition transmission.

SUMMARY OF THE INVENTION

According to the invention, a powershift-capable multi-ratio transmission is proposed which is arranged in the drivetrain of a vehicle, having at least one sun gear, at least one stepped planet gear, at least one ring gear, a drive shaft and an output shaft. The powershift-capable multi-ratio transmission according to the invention can, by means of the at least one stepped planet gear, be shifted into a first-ratio shift state or into a second-ratio shift state, wherein a first ring gear is assigned a first brake and a second ring gear is assigned a second brake. In a manner dependent on the actuation thereof, in the individual shift states, a torque flow is present in a first-ratio shift state or in a second-ratio shift state. The torque can be transmitted in an overrun direction and in a traction direction, and all shifts between the states can be performed as powershifts.

The solution proposed according to the invention is characterized in particular by the fact that, through the use of two brakes which either can be actuated in a coupled-together manner or can be actuated individually, a powershift can be achieved in the traction mode and in the overrun mode of the powershift-capable multi-ratio transmission proposed according to the invention. In this way, it is possible in particular to avoid overrun or recuperation interruptions. Furthermore, no synchronization is necessary; a simple actuation can be effected by means of only one actuator in the case of the two brakes being shifted as a double brake.

In a refinement of the powershift-capable multi-ratio transmission proposed according to the invention, this comprises one planet carrier on which the at least two stepped planet gears are held, wherein the planet carrier is directly connected to the output shaft.

As an alternative to the above-presented design variant of the powershift-capable multi-ratio transmission proposed according to the invention, this may comprise a second sun gear which is connected to the output shaft and about which the stepped planet gears revolve.

The powershift-capable multi-ratio transmission proposed according to the invention comprises a first brake and a second brake. These can either be actuated independently of one another by means of separate actuators, which allows greater freedom in the control of the powershift-capable multi-ratio transmission. It is alternatively possible for the first brake and the second brake to be used in a coupled-together manner as a double brake. For example, the first brake and the second brake may be coupled together by means of a shift sleeve. This is moved within a bidirectional movement travel by means of an actuator with a screw drive, and actuates either the first brake, wherein the second brake is in a released state, or the second brake, wherein the first brake is in a released state.

In the design variant of the two brakes as a double brake, only one actuator is required.

Pursuing the solution proposed according to the invention further, in the first-ratio shift state and in a closed position of the second brake, if load is introduced through the drive shaft, a traction-mode torque flow through the powershift-capable multi-ratio transmission is present. In the first-ratio shift state and in a closed position of the second brake, if load is introduced through the output shaft, an overrun-mode torque flow is present, for example during downhill travel, in the case of which a battery of an electrically operated vehicle can be charged by conversion of kinetic energy into electrical energy.

In a refinement of the powershift-capable multi-ratio transmission proposed according to the invention, in a second-ratio shift state and in a closed position of the first brake, if load is introduced through the drive shaft, a traction-mode torque flow is present. In the second-ratio shift state and in a closed position of the first brake, if load is introduced through the output shaft, the overrun-mode torque flow is present, for example by means of downhill travel in the recuperation mode of an electrically operated vehicle.

Furthermore, in the case of the powershift-capable multi-ratio transmission, a parking-lock shift state can be realized by virtue of both the first brake and the second brake being transferred into their closed state and remaining there. In this way, the entire powershift-capable multi-ratio transmission is blocked.

The powershift-capable multi-ratio transmission proposed according to the invention may for example be arranged in a drive axle of an electrically operated vehicle in an axially parallel arrangement with respect to a differential transmission.

It is furthermore also possible for the powershift-capable multi-ratio transmission proposed according to the invention to be used in a position perpendicular to a drive axle of an electrically operated vehicle. Here, a bevel gear pair would be required, which realizes the 90° diversion.

In a refinement of the solution proposed according to the invention, the powershift-capable multi-ratio transmission may also be integrated, in a coaxial arrangement, into a drive axle of an electrically operated vehicle. In this design variant, it would be necessary for the electric machine of the electrically operated vehicle to be designed in particular as a hollow-shaft machine, which yields structural space advantages for an electric axle component for electrically operated vehicles.

The solution proposed according to the invention advantageously makes it possible, through the use of two brakes, to implement a powershift of the powershift-capable multi-ratio transmission in the traction mode and in the overrun mode. In particular, no interruptions in overrun/recuperation occur during the shift processes. The two brakes may either be actuated individually and independently of one another; additionally, in one advantageous design variant, it is also possible for the two brakes to be coupled to one another for example via a shift sleeve, such that, in this design variant, one actuator can be omitted. Furthermore, in the solution proposed according to the invention, a parking lock function can be implemented in a particularly simple manner by blocking of the transmission in the case of both brakes being closed simultaneously.

The bidirectional powershift-capable multi-ratio transmission proposed according to the invention may, for example for structural units such as electric drive axles which are used in the drivetrain of an electrically operated vehicle, be integrated as an axle drive. On the one hand, it is possible for the powershift-capable multi-ratio transmission proposed according to the invention to be arranged in an axially parallel arrangement, or axially perpendicular, with respect to the drive axle of an electrically driven vehicle. In the case of the axially parallel arrangement, a connection may be realized via a spur-gear stage; in the case of the axially perpendicular arrangement of the powershift-capable multi-ratio transmission proposed according to the invention, a connection is realized via a bevel gear arrangement, which compensates a 90° diversion. The bidirectionally powershift-capable multi-ratio transmission proposed according to the invention may also be integrated into a differential transmission, and it is also possible for the powershift-capable multi-ratio transmission proposed according to the invention to be combined with a torque vectoring unit.

A further advantageous aspect of the powershift-capable multi-ratio transmission proposed according to the invention can be seen in the fact that, as a result of the design as a multi-ratio transmission, smaller drive units can be used in order to satisfy the set drive requirements.

Planetary transmissions have the highest power density of all transmission types, and the transmission is therefore lightweight and very compact. Two ratios allow more efficient operation of the electric machine that is used.

BRIEF DESCRIPTION OF THE DRAWINGS

The invention will be described in more detail below on the basis of the drawing, in which.

DETAILED DESCRIPTION

The powershift-capable multi-ratio transmission 10 described below may be used both in drivetrains of electrically operated vehicles and in partially electrified vehicles which have a conventional internal combustion engine and which are equipped with a standard transmission.

Figure 1:
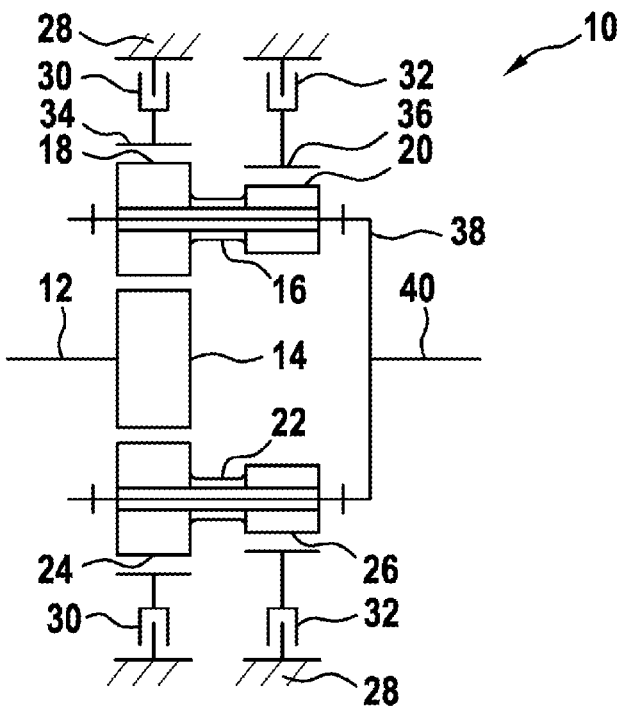
FIG. 1 shows a design variant of the powershift-capable multi-ratio transmission proposed according to the invention with a first and a second brake.

The illustration as per FIG. 1 shows a first design variant of the powershift-capable multi-ratio transmission 10 proposed according to the invention.

The powershift-capable multi-ratio transmission 10 as per FIG. 1 comprises a drive shaft 12 on which a first sun gear 14 is held. A first stepped planet gear 16 and at least one further, second stepped planet gear 22 revolve around the first sun gear 14. The first stepped planet gear 16 comprises a first step 18 and a second step 20. An analogous description applies to the second stepped planet gear 22 illustrated in FIG. 1, which has a first step 24 and a further, second step 26, wherein the second step 26 may have a smaller number of teeth than the first step 24 of the second planetary stepped gear.

As can also be seen from the illustration as per FIG. 1, the first steps 18 and 24 respectively of the two stepped planet gears 16, 22 revolve both around the first sun gear 14 and within a first ring gear 34. An analogous description applies to a second ring gear 36, within which the in each case second steps 20 and 26 respectively of the two stepped planet gears 16 and 22 respectively revolve.

The first ring gear 34 is assigned a first brake 30, whereas the second ring gear 36 is assigned a further, second brake 32. As can also be seen from FIG. 1, the at least two stepped planet gears 16 and 22 are held on a planet carrier 38, which is connected to an output shaft 40 of the powershift-capable multi-ratio transmission 10.

Figure 2:
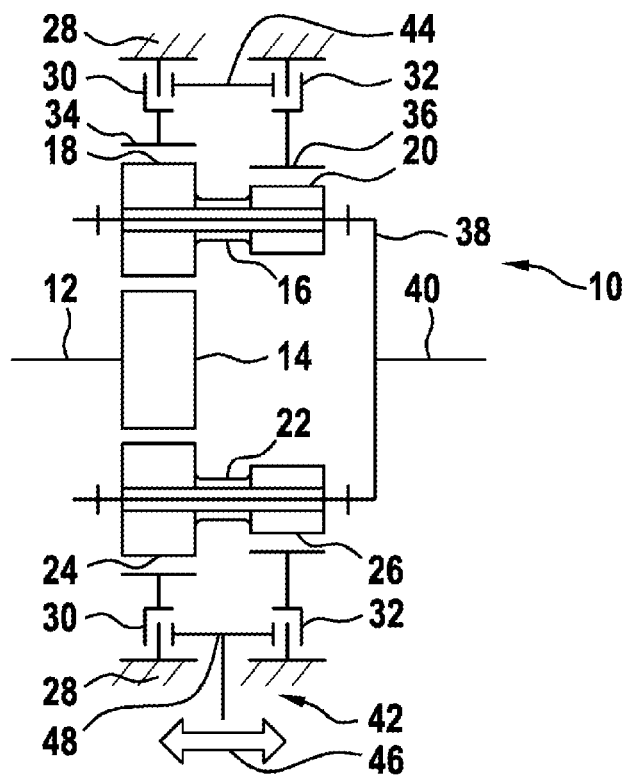
FIG. 2 shows the coupling of the first and second brake on the powershift-capable multi-ratio transmission, with the actuation thereof by an actuator.

FIG. 2 shows the first design variant, illustrated in FIG. 1, of the powershift-capable multi-ratio transmission 10 with two brakes 30 and 32. In the design variant illustrated in FIG. 1, the two brakes 30 and 32 are actuatable independently of one another, that is to say require in each case one actuator for the purposes of actuation. By contrast, FIG. 2 illustrates a variant in which the first brake 30 and the second brake 32 are coupled to one another for example via a shift sleeve 44, and actuation is performed in the form of a double brake 42. This means that only one actuator 48, for example with a screw drive, is required in order to move the shift sleeve 44 in accordance with a bidirectional movement travel 46—as indicated in FIG. 2. By means of the double brake 42 as per FIG. 2, either the first brake 30 is closed, wherein the second brake 32 is open, or the second brake 32 is closed, wherein the first brake 30 is open. An advantage here is the requirement for only one actuator 48.

In the first ratio of the powershift-capable multi-ratio transmission 10 as per the first embodiment thereof, the force flow runs from the drive shaft 12 to the first sun gear 14. Via this, the two stepped planet gears 16, 22 are driven by means of the toothings of the first step 18 and of the second step 26. The output of drive to the output shaft 40 takes place via the planet carrier 38. In the first ratio, the second brake 32 is closed and the second ring gear 36 is blocked. As a result, the toothings of the second step 20 of the first stepped planet gear 16 and those of the second step 26 of the second stepped planet gear 22 roll on the toothing of the static second ring gear 36.

The force flow in the second ratio of the powershift-capable multi-ratio transmission as per the design variant illustrated in FIGS. 1 and 2 runs from the drive shaft 12 via the first sun gear 14 to the first stepped planet gear 16 and the second stepped planet gear 22, or the second steps 20 and 26 respectively thereof. From there, the output of drive takes place via the planet carrier 38 to the output shaft 40. Here, the first ring gear 34 is immobilized by the brake 30.

A reverse ratio is realized, in the case of the electric machine being driven in a reverse direction, from the output shaft 40 via the planet carrier 38 to the first steps 18, 24 of the stepped planet gears 16, 22 to the first sun gear 14. From there, output of drive takes place via the first sun gear 14 to the drive shaft 12. In the reverse ratio, the same force flow is present as in the first ratio, merely with a reversed direction of rotation of the electric machine. In this case, the first brake 30 is open, whereas the second brake 32 assumes its closed position 52.

Figure 3:
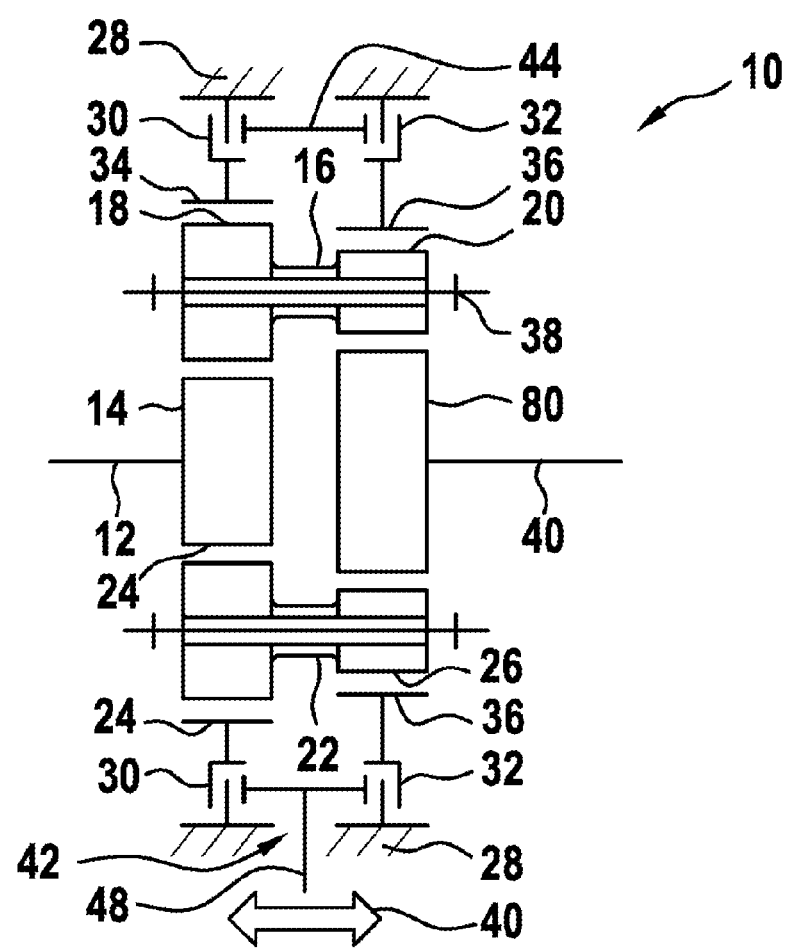
FIG. 3 shows a design variant of the powershift-capable multi-ratio transmission proposed according to the invention with a second sun gear.

FIG. 3 shows a second design variant of the powershift-capable multi-ratio transmission 10 proposed according to the invention.

In the case of the further, second design variant of the powershift-capable multi-ratio transmission 10 illustrated in FIG. 3, a second sum gear 80 is used. The second sun gear 80, about which the second steps 20 and 26 respectively of the two stepped planet gears 16 and 22 respectively revolve, is connected directly to the output shaft 40 of the powershift-capable multi-ratio transmission 10. Analogously to the first design variant of the powershift-capable multi-ratio transmission 10, the second design variant has the drive shaft 12 and the first sun gear 14. Furthermore, analogously to the illustration as per FIG. 1, the two ring gears 34, 36 are in each case assigned the first brake 30, with regard to the first ring gear 34, and the second brake 32, with regard to the second ring gear 36. The two stepped planet gears 16 and 22 are held on the planet carrier 38. The planet carrier 38 as per the further, second design variant of the powershift-capable multi-ratio transmission 10 is slightly modified in relation to the planet carrier 38 as per the first design variant of the powershift-capable multi-ratio transmission 10, as illustrated in FIG. 2.

In the illustration as per FIG. 3, it is furthermore indicated that the first brake 30 and the second brake 32 are connected to one another via the shift sleeve 44. The shift sleeve 44 in turn is moved within the bidirectional movement travel 46 by means of the actuator 48, which may for example be equipped with a screw drive. Owing to the actuation of the two brakes 30 and 32 as a double brake 42, one actuator is omitted in comparison to a separate activation of the first brake and of the second brake 32. In the case of the actuation of the two brakes 30, 32 as a double brake 42, either the first brake is closed, wherein the second brake 32 is open, or the first brake 30 is open, whereas the second brake 32 is closed.

Figure 4:
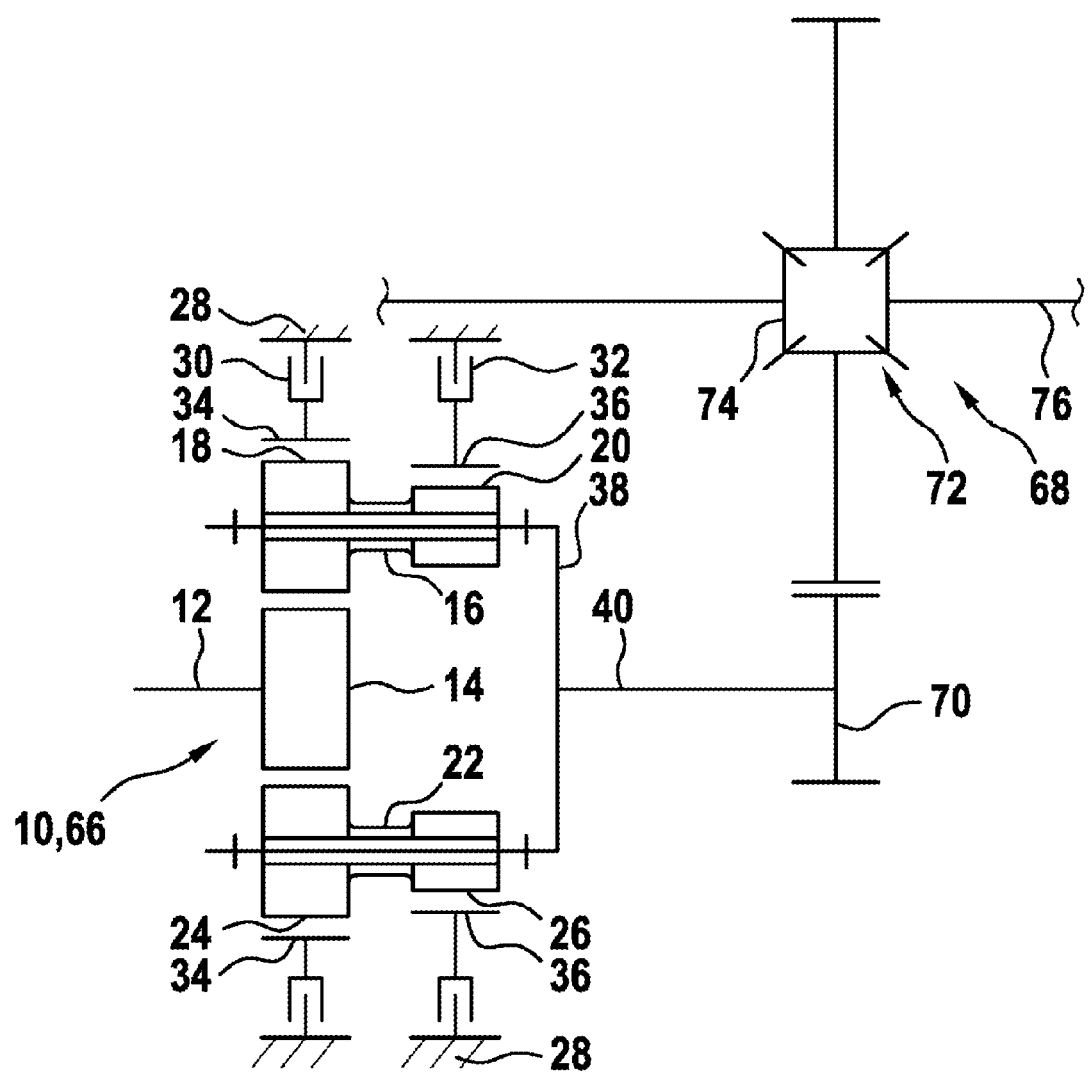
FIG. 4 shows an axially parallel arrangement of the design variant of the powershift-capable multi-ratio transmission as per FIG. 1 with respect to the drive axle of a vehicle.

The illustration as per FIG. 4 shows the powershift-capable multi-ratio transmission 10 proposed according to the invention, which, by means of a spur gear stage 70, drives differential transmission 72 of a drive axle 68.

The powershift-capable multi-ratio transmission 10 illustrated in FIG. 4 is arranged in an axially parallel arrangement 66 in relation to the drive axle 68 of the vehicle. The powershift-capable multi-ratio transmission 10 as per the illustration in FIG. 4 is driven via the drive shaft 12, on which the first sun gear 14 is held. Said first sun gear meshes with at least two stepped planet gears 16 and 22, which have in each case one first step 18, 24 and one second step 20, 26. The at least two stepped planet gears 16 and 22 in turn mesh with the first ring gear 34, which is in turn assigned the first brake 30 which is supported on the housing 28 of the powershift-capable multi-ratio transmission 10. The two second steps 20 and 26 respectively of the first stepped planet gear 18 and of the second stepped planet gear 22 revolve within the second ring gear 36. The at least two stepped planet gears 16 and 22 are held on a planet carrier 38, which is in turn connected to the output shaft 40. The two second steps 20 and 26 of the first stepped planet gear 16 and of the second stepped planet gear 22 revolve within the second ring gear 36, which is assigned the second brake 32, which in turn is likewise supported on the housing 28 of the powershift-capable multi-ratio transmission 10. The output shaft 40 of the powershift-capable multi-ratio transmission 10 is connected to an input gearwheel of the spur-gear stage 70.

The differential transmission 72 comprises a cage 74, from which an axle output 76 extends to the drive axle 68 to the driven wheels (not illustrated here) of the vehicle.

Figure 5:
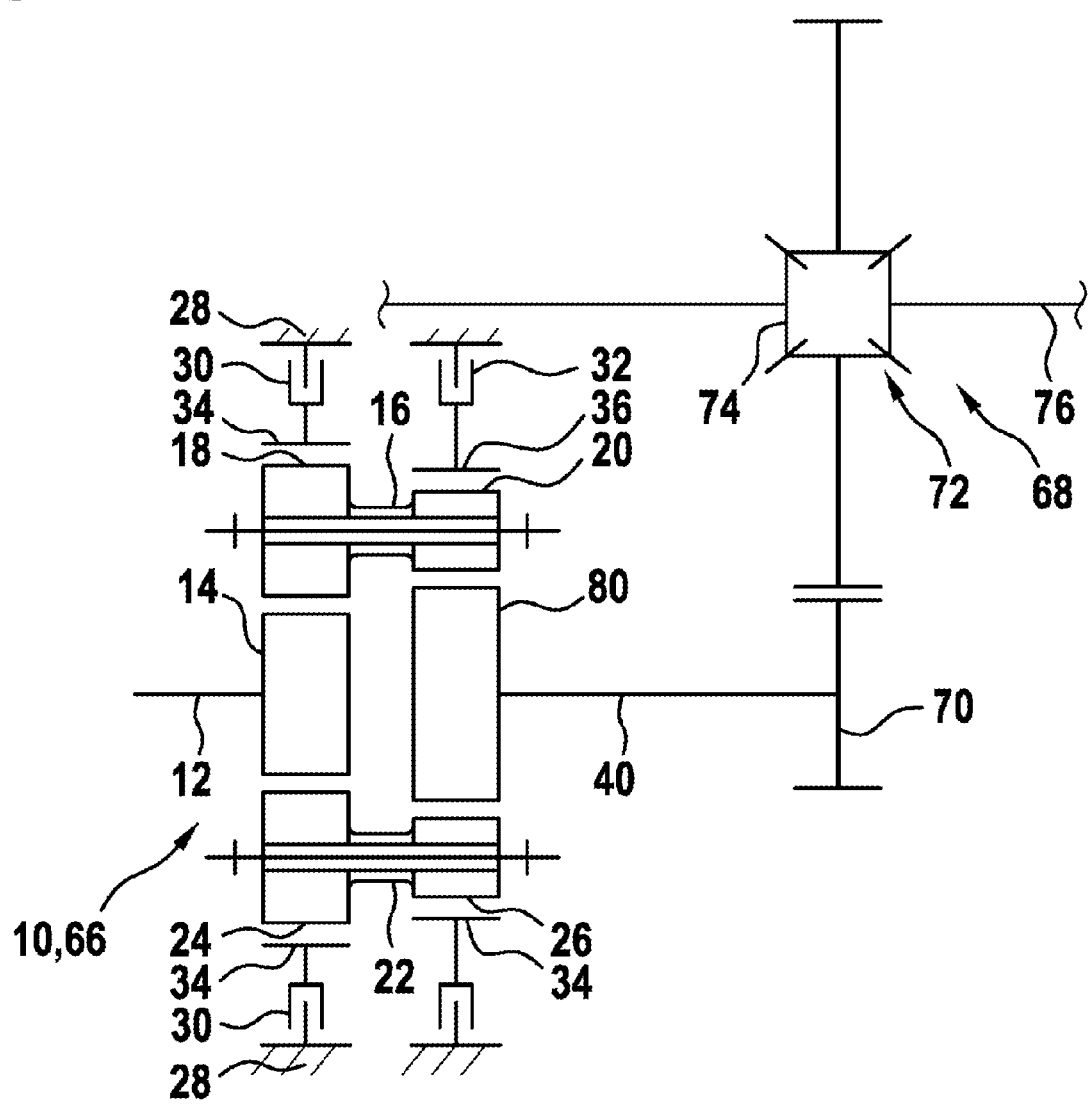
FIG. 5 shows the arrangement of the second design variant of the powershift-capable multi-ratio transmission axially parallel with respect to a drive axle of an electrically operated vehicle.

FIG. 5 shows the powershift-capable multi-ratio transmission 10 as per its second design variant, in an axially parallel arrangement 66 with respect to a drive axle 68 of a vehicle.

The powershift-capable multi-ratio transmission 10 illustrated in FIG. 5 is arranged in an axially parallel arrangement 66 in relation to the drive axle 68 of a vehicle and drives the differential transmission 72 via the spur-gear stage 70. The differential transmission 72 comprises the cage 74, from which the axle output 76 extends. These drive driven wheels (not illustrated in FIG. 5) of a vehicle.

The powershift-capable multi-ratio transmission 10 illustrated in FIG. 5 is the second design variant of the powershift-capable multi-ratio transmission 10 proposed according to the invention as illustrated in FIG. 3. The second design variant of the powershift-capable multi-ratio transmission 10 differs from its first design variant in that the second sun gear 80 is provided, which acts directly on the output shaft 40, which in turn, in this case, acts as drive shaft for the spur-gear stage 70.

The invention is not restricted to the exemplary embodiments described here and to the aspects highlighted therein. Rather, within the scope specified by the claims, numerous modifications are possible which lie within the capabilities of a person skilled in the art.

What is claimed is:

1. A powershift-capable multi-ratio transmission (10) which is arranged in a drivetrain of a vehicle, the transmission (10) having a first sun gear (14), having stepped planet gears (16, 22), having at least one ring gear (34, 36) and a drive shaft (12) and also an output shaft (40), characterized in that the powershift-capable multi-ratio transmission (10) is configured to, by the stepped planet gears (16, 22), be shifted into a first-ratio shift state or into a second-ratio shift state and vice versa, wherein a first ring gear (34) is assigned a first brake (30) and a second ring gear (36) is assigned a second brake (32), in a manner dependent on an actuation of which, in the shift states, at least a traction-mode torque flow and at least an overrun-operation torque flow through the powershift-capable multi-ratio transmission (10) is present, the transmission (10) further comprising a second sun gear (80) which is directly connected to the output shaft (40) and about which the stepped planet gears (16, 22) revolve.

2. The powershift-capable multi-ratio transmission (10) as claimed in claim 1, further comprising one planet carrier (38) that holds two of the stepped planet gears (16, 22) and that is connected to the output shaft (40).

3. The powershift-capable multi-ratio transmission (10) as claimed in claim 1, characterized in that the first brake (30) and the second brake (32) are actuated separately from one another in an independent manner.

4. The powershift-capable multi-ratio transmission (10) as claimed in claim 1, characterized in that the first brake (30) and the second brake (32) are actuated in a coupled-together manner as a double brake (42).

5. The powershift-capable multi-ratio transmission (10) as claimed in claim 4, characterized in that the first brake (30) and the second brake (32) are coupled by a shift sleeve (44) which is moved within a bidirectional movement travel (46)

by an actuator (48) with screw drive and which actuates either the first brake (30) or the second brake (32).

6. The powershift-capable multi-ratio transmission (10) as claimed in claim 1, characterized in that, in the first-ratio shift state and in a closed position of the second brake (32), if load is introduced through the drive shaft (12), the traction-mode torque flow is present.

7. The powershift-capable multi-ratio transmission (10) as claimed in claim 1, characterized in that, in the first-ratio shift state and in a closed position of the second brake (32), if load is introduced through the output shaft (40), the overrun-mode torque flow is present.

8. The powershift-capable multi-ratio transmission (10) as claimed in claim 1, characterized in that, in the second-ratio shift state and in a closed position of the first brake (30), if load is introduced through the drive shaft (12), the traction-mode torque flow is present.

9. The powershift-capable multi-ratio transmission (10) as claimed in claim 1, characterized in that, in the second-ratio shift state and in a closed position of the first brake (30), if load is introduced through the output shaft (40), the overrun-mode torque flow is present.

10. The powershift-capable multi-ratio transmission (10) as claimed in claim 1, characterized in that, in the parking-lock shift state, the first brake (30) and the second brake (32) are in the closed state.

11. The powershift-capable multi-ratio transmission (10) as claimed in claim 1, characterized in that the transmission (10) is arranged in a drive axle (68) of an electrically operated vehicle in an axially parallel arrangement (66) with respect to a differential transmission (72).

12. The powershift-capable multi-ratio transmission (10) as claimed in claim 1, characterized in that the transmission (10) is arranged in a position perpendicular to a drive axle (68) of an electrically operated vehicle.

13. The powershift-capable multi-ratio transmission (10) as claimed in claim 1, characterized in that the transmission (10) is integrated, in a coaxial arrangement, into a drive axle (68) of an electrically operated vehicle, the electric machine of which is designed as a hollow-shaft electric machine.

* * * * *